Oct. 9, 1962     C. O. GLASGOW     3,057,427
SUPPLEMENTAL DRIVE FOR VEHICLES
Filed March 27, 1961
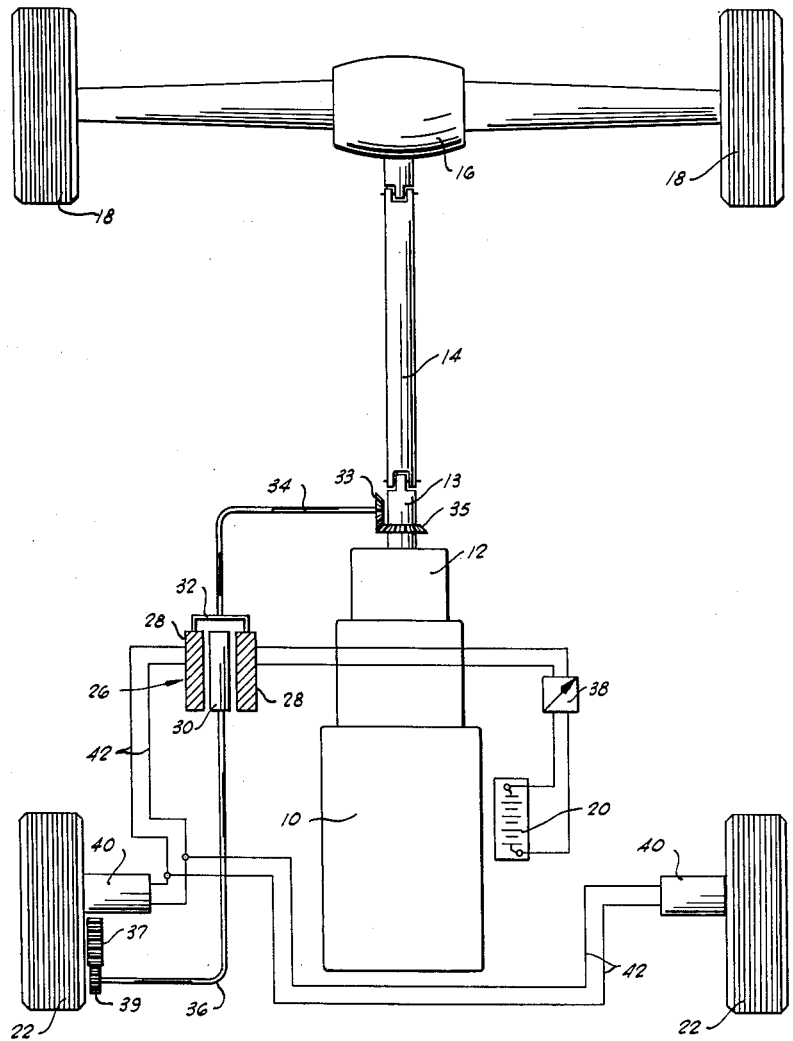
INVENTOR.
CLARENCE O. GLASGOW
BY
*Dunlap, Laney & Hubbard*
ATTORNEYS ়
United States Patent Office 3,057,427
Patented Oct. 9, 1962

3,057,427
SUPPLEMENTAL DRIVE FOR VEHICLES
Clarence O. Glasgow, 2620 S. Yorktown, Tulsa, Okla.
Filed Mar. 27, 1961, Ser. No. 98,666
5 Claims. (Cl. 180—44)

The present invention relates generally to improvements in motor vehicles, and more particularly, but not by way of limitation, relates to a supplemental drive means which operates when the drive wheels of a vehicle lose traction.

As is well known, conventional motor vehicles sometimes become stalled in mud, snow or on ice when the drive wheels, usually the rear wheels, lose traction. In such a case, the rear wheels spin at relatively high speeds while the front wheels are usually motionless. At other times, as a result of an excessive amount of power when traveling over ice, snow or wet highways, the rear wheels lose traction and begin to spin at high speed. This high-speed spinning also causes the rear wheels to lose lateral traction and the vehicle has a pronounced tendency to skid to the side. Unless immediately corrected, the vehicle operator may lose control and the vehicle may overturn or collide with another vehicle or another object.

Usually, when the vehicle becomes stalled, only a relatively small additional pull is required to get the vehicle in motion again. Similarly, when a vehicle begins to skid sideways due to loss of traction in the rear wheels, a slight additional pull from the front wheels would be sufficient to hold the vehicle straight and stop the lateral skid of the rear end of the vehicle.

Accordingly, it is contemplated by the present invention to provide a motor vehicle with supplemental means for driving the front wheels when the rear wheels lose traction. The drive comprises an electric generator having a stator rotating at a speed proportional to the speed of the rear or drive wheels of the vehicle, and a rotor rotating at a speed proportional to the speed of the front wheels; and, an electric motor is connected to receive the generated electrical power from the generator and arranged to drive the front wheels of the vehicle. When the rear wheels lose traction, the difference between the speed of rotation of the stator and that of the rotor generates an electric current which is supplied to the electric motors to drive the front wheels.

Therefore, an important object of the present invention is to provide a supplemental drive for vehicles which automatically commences to operate when the drive wheels of the vehicle lose traction.

Another object of the present invention is to provide a supplemental drive means of the type described which delivers power in proportion to the amount of traction lost due to slippage of the main drive wheels.

Another object of the present invention is to provide a device which will automatically assist in recovering control of a vehicle which skids to one side due to a loss of traction in the rear drive wheels.

Another object of the present invention is to provide a device of the type described which can be installed on conventional type automobiles or other motor vehicles now in production with a minimum of alterations.

Another object of the present invention is to provide a supplemental drive means of the type described which is relatively simple and can be inexpensively manufactured.

Additional objects and advantages will be evident from the following detailed description and drawing.

The single FIGURE is a schematic illustration of a device constructed in accordance with the present invention.

Referring now to the drawing, a conventional type motor vehicle has an internal combustion prime mover 10 connected to a drive train comprising a transmission 12, a transmission output shaft 13, a drive shaft 14, a differential 16, and two rear drive wheels 18. The vehicle may have a conventional electric system including a storage battery 20 which may be recharged in a conventional manner by a generator or alternator (not shown). The vehicle is also provided with a pair of front wheels 22 which are normally not driven and are pivotable in the conventional manner to provide a means for steering the vehicle.

In accordance with the present invention, an electric generator, indicated generally by the reference numeral 26, is provided with a rotatable stator 28 and a rotatable rotor 30. The stator 28 is connected by means of a yoke 32 to a rotating, flexible shaft 34. The shaft 34 is geared to, and rotated by, the output shaft of the transmission 12. Any suitable gearing connection with the output shaft 13 of the transmission 12 may be used to rotate the flexible shaft 34. For example, a ring gear 35 may be provided on the output shaft 13 and a pinion 33 connected to the flexible shaft 34 and disposed in meshing relation to the ring gear.

The flexible shaft 34 is preferably geared to the output shaft 13 of the transmission so that the stator 28 will be rotated at a speed directly proportional to the speed of whichever rear wheel 18 is rotating the fastest. In this connection, it will be appreciated that either of the rear wheels 18 may lose traction. In such a case, no power is delivered from the differential 16 to the particular drive wheel 18 which has not lost traction and which is, therefore, rotating at a slower speed, or perhaps is at a standstill. Instead, the conventional motor vehicle differential delivers all power to the wheel which has lost traction and the wheel losing traction is rotated at a high speed. For this reason, it is desirable to connect the rotating shaft 34 to the drive train somewhere between the transmission 12 and the differential 16. When the conventional differential 16 is not in use, the shaft 34 may be geared to either of the drive wheels, as desired.

The rotor 30 of the generator 26 is rotated by a flexible shaft 36 which is geared to a front wheel 22 in such a manner that the rotor 30 will be turned in the same direction as the stator 28. The gearing is chosen so that when the front wheels 22 are rotating at the same speed as the rear wheels 18, the rotor will rotate at the same speed as the stator. Any suitable gearing, such as a ring gear 37 and a pinion 39, may be used to gear the shaft 36 to the front wheel. The flexible shafts 34 and 36 may be of any suitable construction, such as the type used in the art to drive speedometers, which comprise a flexible shaft housed within a flexible sheath.

The generator 26 may be suitably excited by the automobile battery 20. The degree of generator excitation may be controlled by a rheostat 38, or other suitable control means located on the instrument panel of the vehicle, to thereby control the magnitude of the electrical power generated.

An electric motor 40 is geared to the hub of each front wheel 22 in a manner to drive the wheel. Hub-mounted electric motors for driving each individual wheel of a vehicle are well known in the art, a specific example being described in detail in U.S. Patent Number 2,581,551 issued to G. M. Myrmirides on January 8, 1952. The particular details of construction of the electric motor and gearing arrangement used for driving the front wheels 22 does not comprise a part of the present invention and therefore is not described in detail. The electric drive motors 40 are preferably of the direct current type and may be self-excited or may be excited by current from the battery 20. Also, the motors 40 are preferably series-wound to give maximum torque at lower speeds, but could be compound-wound, as desired, to give better performance at higher speeds. Suitable conductor means 42 interconnect the generator 26 and the electric drive motors 24 to deliver the electrical power generated by the generator 26 to the drive motors 24.

OPERATION

When neither of the rear wheels 18 has lost traction, the rear wheels 18 and the front wheels 22 will be rotating at the same speed, provided the diameter of the tires on the wheels are equal. Slight differences in the diameter of the four tires due to tread wear will not result in any appreciable difference to rotational speeds of the front and rear sets of wheels. Accordingly, the rotor 30 and the stator 28 will be rotating at the same speed in the same direction and no current will be generated by the generator 26. However, when one of the rear wheels 18 loses traction, the transmission output shaft 13 will speed up, causing relative rotational motion between the stator 28 and the rotor 30. The relative rotational motion will generate a current which will be supplied by the conductors 42 to the electric drive motors 40 which in turn will drive the front wheels 22.

The power generated by the generator 26 will be proportional to the difference in rotational speeds between the stator 28 and the rotor 30, which is proportional to the traction lost by the rear wheel. Therefore, when the vehicle becomes stalled in mud, snow or other mire, the rear wheels 18 can be made to spin at relatively high speeds while the front wheels 22 will stand substantially motionless. This results in a relatively great difference in speed between the stator 28 and the rotor 30 which will generate as much power as required to drive the electric motors 40 and set the vehicle in motion again. When the rear wheels lose traction while traveling on a slippery street or highway and begin to skid sideways, the difference in speed between the rear wheels and the front wheels will again cause the generator to generate power. Of course, the generated power will be of smaller magnitude due to the smaller difference in speeds of the rotor and stator, but the power generated will be proportional to the power lost and will usually be sufficient to pull the vehicle out of a skid.

As previously mentioned, the supplemental power required is small when compared to the power required of of the internal combustion prime mover 10. Therefore, the elements of the supplemental drive means can be relatively small in size. The elements can be even further reduced in size if the rotor and stator are made to rotate at several times the speed of the wheels by suitable gearing ratios. Therefore, the elements can be reasonably economically produced. It will also be noted that the supplemental drive device can easily be manufactured in kit form for installation on production vehicles without appreicable alteration of the vehicle.

Having thus described a specific embodiment of my invention in detail, it is to be understood that various changes can be made therein without departing from the spirit and scope of my invention as defined by the appended claims.

I claim:
1. A supplemental drive apparatus for a motor vehicle having a first set of wheels driven by a prime mover and a second set of wheels not driven by a prime mover, the supplemental drive apparatus comprising: a generator carried by the vehicle and having a rotating stator and a rotating rotor, a first flexible cable driven by one of the sets of wheels and connected to rotate the rotor at a speed proportional ot the speed of said one of the sets of wheels, a second flexible cable driven by the other set of wheels and connected to rotate the stator at a speed proportional to the speed of said other set of wheels, the stator and rotor being rotated at the same speed and in the same direction when the first and second sets of wheels are rotated in the same direction at the same speed, and being rotated at different speeds to produce electric power when the sets of wheels are rotating at different speeds, and electric motor means driven by the electric power generated, the electric motor means being connected to drive at least one wheel of the second set of wheels.

2. A supplemental drive apparatus for a motor vehicle having a prime mover connected to drive a first set of wheels by means of a drive train having a transmission with an output shaft connected to drive a differential, and a second set of wheels not driven by a prime mover, the supplemental drive apparatus comprising: a generator carried by the vehicle having two rotating elements which when rotated relative to each other generate electrical power, a first flexible cable geared to the output shaft of the transmission and connected to rotate one of the rotating elements at a speed proportional to the speed of the output shaft, a second flexible cable geared to one wheel of the second set of wheels and connected to rotate the other rotating element, the rotating elements being rotated in the same direction at the same speed when the first and second sets of wheels are rotating in the same direction at the same speed and being rotated at different speeds to generate electric power when at least one of the first set of wheels is rotating at a greater speed than that of the second set of wheels, and electric motor means driven by the electric power generated, the electric motor means being connected to drive at least one wheel of the second set of wheels.

3. A supplemental drive apparatus as described in claim 2 wherein each wheel of the second set of wheels is driven by a separate electric motor.

4. A supplemental drive apparatus as described in claim 3 wherein the generator generates direct current electrical power and each of the electric motors are direct current motors.

5. A supplemental drive apparatus for a motor vehicle having a first set of wheels driven by a prime mover and a second set of wheels not driven by the prime mover, the supplemental drive apparatus comprising:

a generator having a rotatable stator and a rotatable rotor, means mechanically coupling the stator to one of the sets of wheels for rotating the stator at a speed proportional to the speed of said one of the sets of wheels, means mechanically coupling the rotor to the other of the sets of wheels for rotating the rotor at a speed proportional to the speed of said other of the sets of wheels, the respecting means rotating the rotor and stator in the same direction and at the same proportionate speeds to the respective sets of wheels, electric motor means connected to drive at least one of the wheels of the second set, and electric circuit means interconnecting the generator and the electric motor means for supplying electric power generated by the generator as a result of relative rotation between the rotor and stator to drive the electric motor when said first set of wheels is rotated at a greater speed than said second set of wheels.

References Cited in the file of this patent
UNITED STATES PATENTS

| 871,098 | Albrecht | Nov. 19, 1907 |
| 2,244,216 | Pieper | June 3, 1941 |
| 2,851,115 | Buckendale | Sept. 9, 1958 |
| 2,959,237 | Hill | Nov. 8, 1960 |

FOREIGN PATENTS

| 12,900 of 1905 | Great Britain | Mar. 22, 1906 |